Patented Nov. 10, 1931

1,831,728

UNITED STATES PATENT OFFICE

EARL B. WORKING, OF MANHATTAN, KANSAS, ASSIGNOR TO AMERICAN LECITHIN CORPORATION, OF ATLANTA, GEORGIA, A CORPORATION OF DELAWARE

SHORTENING COMPOSITION AND METHOD

No Drawing.     Application filed July 16, 1930. Serial No. 468,462.

The present invention relates to the manufacture and use of a novel shortening composition in baking processes, such as the making of bread, cake, pastry and the like, namely this shortening composition is primarily intended for use in the bakery, or in the production of such products as are produced in the bakery, in conjunction with the use of flour as a major component of the material. The base of the shortening composition may be fatty materials such as are commonly used in shortenings, these being for example of the oil hydrogenated type, (complete or incomplete), all vegetable type, or compound types including hydrogenated and non-hydrogenated products, or including partly animal oils and partly vegetable oils (either or both of which can be partly or completely hydrogenated), or in fact any suitable fatty base may be employed.

As is well known, ordinary shortening, when exposed to the air, begins after a time to oxidize and become rancid, the degree and rapidity of such change depending upon the nature of the components of the fatty material. The overcoming of this objection may be referred to as improving the chemical stability of the shortening.

Another difficulty often experienced in the securing of the desired consistency, is the fact that many shortening compositions, after standing around for awhile, whether open or not, have a tendency to become non-uniform, showing a tendency to spot and streak, or becoming more or less transparent. The overcoming of this difficulty may be referred to as improving the physical stability of the product.

My researches have shown that these objectionable properties can be overcome, either fully or to a considerable extent, by the addition of a small percentage of phosphatides and particularly edible lecithin, such as that produced from soybean. The amount of lecithin necessary for producing good physical and chemical stability is small, such as 0.01% up to 0.1%. Quantities which will give good results are, in some instances, 0.2%, 0.25%, 0.5% or 1%. However I do not restrict myself to these exact proportions for the reason that in some cases it may be advisable to use even more of the lecithin or phosphatides.

My researches have further shown that the addition of phosphatides, for example lecithin, greatly increases the creaming qualities of the shortening, and materially intensifies their shortening power, both of which are properties of the utmost importance to the baker. These properties are found to be very substantially improved by the use of quantities of 0.2% or 0.25% up to 0.5% or even 1% of the phosphatides, for example lecithin. Larger quanties can be used if desired.

On account of the increased creaming quality and increased shortening power, I am able to produce bakery products of a larger volume, superior texture, improved tenderness, and I am enabled to almost completely overcome the danger of overcreaming.

In producing the shortening material the lecithin or other phosphatides may be added in the amounts specified above, to any of the natural fats or oils, such as lard, lard compounds, tallow, cocoanut oil, cottonseed oil, corn oil or the like, or mixtures of such components, and it is to be understood that the oils, or some of them, may be previously subjected to hydrogenation, which may be partial or complete, to give the required consistency. Obviously the invention is not restricted to the use of any particular oil base or fatty base and it is deemed to be unnecessary to include any specific formulas for the fatty base, these being already well known in the industry.

In making bread the usual amount of shortening is added to the flour, in the manner well known in the making of bread, the other components or materials added in the usual manner and the baking carried on in the usual or any approved manner. The loaf will be found to be of somewhat increased size, and of excellent texture and tenderness. If desired an increased amount of milk can be used in the preparation of the bread dough, without producing an undesired binding or toughening of the dough and of the bread produced therefrom, and without producing a reduction in the volume of the loaf which would ordinarily be expected by the incorporation of an unusually large amount of milk.

In making cakes and similar products, the improved shortening is creamed up with the sugar and then with the eggs or egg white, in the usual manner, and here also it is found that a better tolerance towards milk is secured, in that the colloidal dispersion of the shortening, sugar and eggs is less disturbed by the addition of milk or water. The flour and other components are added and the dough is baked in the usual manner. The creaming volume indicates the degree of colloidal dispersion obtained in the mixture of sugar and egg or egg white, and is of course closely related to the quality of cake which can be produced, and the volume of the loaf of cake produced from a given weight of materials.

The improved shortening can also be employed in the making of pie crust and similar pastry, giving improved lightness and flakiness of the finished pie crust.

The quantity of shortening can be reduced somewhat from existing formulas, to produce about the same quality of lightness, in cases where it is desired not to increase this quality.

I am of course aware that it has heretofore been proposed to add lecithin to margarine and other "butter-substitutes". The present invention does not relate to butter substitutes, which term is understood herein as meaning a substance which can be used as a substitute for butter for spreading onto bread and the like, and my shortening products are not either intended or adapted for such use. The composition is of course suitable for use in frying, but the shortening is primarily intended for use in making products in which flour constitutes a major component of the entire dry materials used, especially bread, cakes and pastry.

It is usual in making margarine or other butter substitutes, to add and well incorporate into the fatty material, some water or aqueous material, and milk solids. These are commonly added as milk or skim milk. In ordinary shortenings such as lard, "lard compound", "shortening compound", it is not usual, and in fact would generally be considered as deleterious, to add water, milk, or other aqueous materials. This is one of the distinctions between margarine or butter substitutes and lard or other shortening fats.

I have referred above to the use of lecithin produced from soybean, but it will be understood that lecithin or phosphatides generally from other sources can be employed, for example that produced from dried buttermilk.

As distinguished from a butter substitute, as the term is properly used, the present shortening compound is practically a solid at ordinary room temperature, whereas the butter substitute is, at this temperature, a very soft, pasty, readily spreadable mass and has to have this consistency in order to be spreadable on a slice of bread.

The increase in shortening power of a shortening due to the addition of 0.25 to 0.5% of licithin varies with the type of shortening, and is difficult to measure with great accuracy, but my work indicates that it varies from 5% to 15%; i. e., the amount of shortening necessary to produce a given shortening effect can be reduced by that amount if the lecithin is added to the shortening. The greatest effect is observed in the case of compound shortenings; the least in the case of the "all hydrogenated" shortenings, such as "Crisco", (a commercial product which I believe is made by partially hydrogenating cotton-seed oil, to a lard-like consistency), which are already high in shortening power due to the affinity for water of certain substances produced during the partial hydrogenation. Thus 8.5 to 9 lbs. of a compound shortening containing lecithin, will be equivalent in shortening power to 10 lbs. of a similar compound not containing lecithin; about 9 lbs. of lard containing lecithin will be equivalent to 10 lbs. of ordinary lard; about 9 to 9.5 lbs. of an all hydrogenated shortening containing lecithin will be equivalent to 10 lbs. of the all-hydrogenated shortening without the lecithin added.

Apparently the increase in shortening power is about the same for cake, bread, and pie crust, though the latter two are more difficult to measure accurately.

Especially in the case of the all hydrogenated shortenings, the addition of the lecithin improves their creaming qualities also when creamed up with powdered sugar, starch, egg white, marshmallow, powdered milk, and the like, as may be used in the preparation of the so-called "butter cream" icings and fillings; and a compound of cocoanut oil, lecithin, and sugar, with or without powdered milk, and with one or more flavorings, makes a very desirable "dipping coating" for cakes and cookies and bonbons of various kinds.

From the above, it will be obvious that irrespective of what kind of shortening is used, the addition of the stated small amounts of lecithin into the dough will materially increase the shortening effect, without impairing the quality of the product, and whereby the other advantages, such as increased volume and improved keeping qualities are also secured.

No claim is made herein to the addition of egg-yolk or the lecithin produced from egg-yolk. Egg-yolk has long been known to contain lecithin, and the lecithin has been extracted therefrom by appropriate methods. Such lecithin however is not as suitable for use in shortenings, and possesses an undesirable flavor, which it is impossible (by methods heretofore known) to entirely remove.

I claim:—

1. In the manufacture of bakery products, made from flour as a major constituent, the herein described step of incorporating with the components of the batch, a shortening agent containing a small percentage of phosphatide.

2. In the manufacture of bakery products, made from flour, as a major constituent and containing an increased amount of milk solids, the herein described step of incorporating with the constituents of the dough batch, a shortening agent containing a small percentage of lecithin whereby the binding or toughening action of the milk solids is re-reduced.

3. In the manufacture of bakery products produced from a raw material containing flour as a major component, the herein described step of incorporating shortening containing a small percentage of lecithin into dough containing more than the usual proportion of milk solids, whereby the quantity of shortening required can be substantially reduced.

4. In the manufacture of bakery products produced from a raw material containing flour as a major component, the herein described step of incorporating a shortening agent consisting largely of fats and fatty oils, and carrrying about 0.01 to 0.25% of lecithin into the dough, whereby the quantity of shortening required can be substantially reduced.

5. In the manufacture of bakery products from components containing flour as a major constituent, the herein described improvement which comprises incorporating with such constituents, a shortening agent containing not more than 1% of lecithin, the amount of said shortening agent being substantially less than would be needed to give the same shortening effect if the lecithin were omitted.

6. In the manufacture of bakery products from components containing flour as a major constituent, the herein described improvement which comprises incorporating with such constituents, a shortening agent containing a small percentage of lecithin, the amount of said shortening agent being substantially less than would be needed to give the same shortening effect if the licithin were omitted.

7. In the manufacture of bakery products, made from flour as a major constituent, the herein described step of incorporating with the components of the batch, a shortening agent containing a small percentage of phosphatide and free from added aqueous materials.

8. In the manufacture of bakery products, made from flour as a major constituent and containing an increased amount of milk solids over the amounts which could safely be used in similar products made with ordinary shortening, the herein described step of incorporating with the constituents of the dough batch, a shortening agent containing a small percentage of lecithin whereby the binding or toughening action of the high content of milk solids is reduced, and free from added aqueous materials.

9. In the manufacture of bakery products, made from flour as a major constituent, the herein described step of incorporating with the components of the batch, a shortening agent containing a small percentage of phosphatide, the amount of such shortening being somewhat less than is commonly employed in making products of that particular type of the usual degree of shortness.

10. A shortening comprising a fatty material of the type of "lard compound" substantially free from water and from aqueous materials, composed essentially of fatty material which is normally a liquid fatty oil and a hard fatty material, rendered opaque and incorporated with about 0.01 up to 1% of lecithin which is free from bad odor and taste, such product being unsuitable as a butter substitute for spreading on bread, said product having improved creaming power and improved shortening power, improved chemical and physical stability, and better mixing properties, as compared with the same amount of the same fatty material without the lecithin added.

In testimony whereof I affix my signature.

EARL B. WORKING.